UNITED STATES PATENT OFFICE.

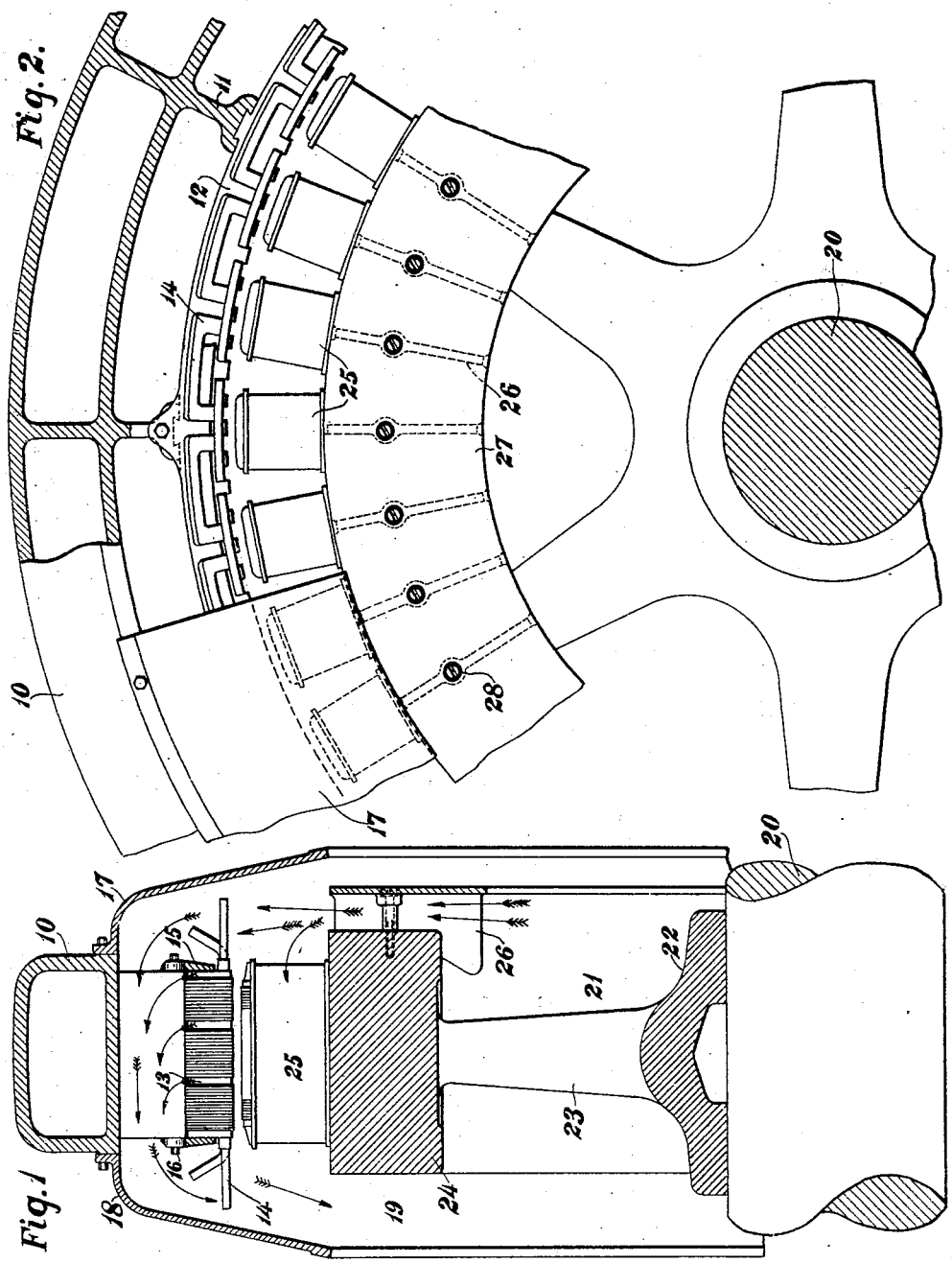

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 927,318.      Specification of Letters Patent.      Patented July 6, 1909.

Application filed May 17, 1906. Serial No. 317,290.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to alternating current generators having rotary field members of the fly-wheel type, although my invention in its broadest aspect is not limited to dynamo-electric machines of this type.

The armature core of an alternator having a rotary field is usually cooled by the fan-like action of the latter, and in some instances fan-blades are secured to the rotor so as to assist in forcing air currents through the passageways of the stationary armature. In an alternator of the fly-wheel type, the rotary field member consists of a spider having a heavy fly-wheel rim, to the outer surface of which field poles are secured. The rim of the spider is usually wider than the field poles and the core of the stationary armature, and hence the fan-blades which are located at the sides of the rim, cannot effectively force air currents through the circumferential passageways of the stationary core.

The object of my invention is to so construct a dynamo-electric machine particularly an alternator having a wide spider rim that a large volume of air can be caused to circulate through the passageways of the stationary core.

In carrying out my invention, I cause air currents from the rotor to circulate across the stator core in such a manner that air currents are induced in the circumferential passageways of the core.

More specifically considered, my invention consists of a dynamo-electric machine, having a stationary laminated core provided with circumferential passageways, a frame supporting the core in such a manner that there are air passageways between the core and the frame, end-shields extending inwardly from the frame, the frame and end-shields being preferably imperforate or cast without openings so that the air can not escape radially outward, a rotary field member comprising a spider having a rim to the outer surface of which field poles are secured, and fan-blades on one side of said rim only, whereby the air currents from the fan-blades are directed outward along one side of the core, over the outer periphery of the latter in one direction, and to the other side, causing air currents to be induced in the passageways in the core because the air pressure at the outer periphery of the core is less than the pressure at the inner periphery thereof, and thus preventing an undesirable rise of temperature therein.

My invention still further consists in the details of construction and combinations of elements described in the specification and set forth in the appended claims.

For a better understanding of my invention, reference is had to the accompanying drawings in which—

Figure 1 is a partial sectional elevation of a dynamo-electric machine equipped with my invention; and Fig. 2 is a partial elevation, parts being broken away and in section for the sake of clearness.

Referring now to the figures of the drawing, 10 represents the frame of a stationary member having inwardly extending transverse radial ribs 11 to which the laminated armature core 12 is secured, preferably by dove-tail projections. The inner wall of the frame is preferably imperforate or cast without any openings for purposes which will appear later. The core 12 is provided with the usual radial circumferential ventilating passageways 13 between the laminæ, and with the usual armature winding 14 having end-turns extending beyond each side of the core. The laminæ are held between end-heads 15 by means of transverse bolts 16. The frame is provided at each side with long inwardly extending end-shields 17 and 18 which are also cast without openings. These end-shields extend inwardly a considerable distance beyond the core, and with the frame form an imperforate inclosure for the armature.

The rotary field member 19 is mounted on the shaft 20 and includes a spider 21 having a hub 22, radial arms 23, and a rim 24. In this case the rotor is of the fly-wheel type, the rim being made very heavy so as to serve as a fly-wheel. Secured to the outer surface of the rim are a number of field magnets 25, which, as is shown in Fig. 1, have a less width than the rim of the spider. It is seen that, if fan-blades were secured to each side of the rim, these blades, being located a considerable distance on each side of the armature core, could force little if any air through the circumferential passageways of the latter. Instead of placing fan-blades on each side of the rim as in a usual construction, I provide fan-blades 26 on one side of the rim only. These fan-blades are provided with an outer shield 27 which may consist of one or more parts as desired, and are secured to the sides of the rim by screws or bolts 28.

The result of this construction will now be explained. When the field member is revolved, air currents from the fan-blades, directed by end-shield 17 which extends inward approximately to the fan-blades, flow outward over the end-turns of the armature coils along one side of the core, across the outer periphery of the core in one direction and then out of the machine through the large central opening of shield 18, the paths of the air currents being indicated by the arrows. It is seen that the air currents thus flowing over the outer surface or periphery of the core cause a diminution of air pressure at the outer periphery of the core, inducing air currents in the circumferential passageways 13 in an outward direction as indicated by the arrows. This outward flow of air in the passageways 13 is probably assisted by the fan-like action of the projecting poles of the rotor. Thus a large volume of air passes through all parts of the core and a dangerous rise of temperature is prevented.

I do not wish to be confined to the details of construction or the exact arrangements of parts here shown and described, as many changes can be made without departing from the spirit and scope of my invention. I aim in my claims to cover all such changes and modifications.

What I claim as new and desire to secure by Letters Patent is:—

1. In a dynamo-electric machine, a stationary armature core, a supporting frame having end-shields extending inward so as to inclose the core, the frame including the end shields being separated from the core by air passageways, a rotary field member comprising a spider having a rim, radial field members on the outer surface of said rim, and fan-blades on one side of said rim only for causing air currents to pass outward between the shield and core, over the outer surface of the core in one direction, and inward between the other shield and core, so that air currents are induced in the passageways in the core.

2. In a dynamo-electric machine, a stationary armature comprising a laminated core having ventilating passageways, a frame having transverse radial ribs supporting said core, said frame having end-shields extending inwardly over each side of the core, a rotary member of the flywheel type comprising a rim, field poles on said rim, and fan-blades on one side of said rim only so that air currents are forced outward between one shield and one side of the core and across the outer periphery of the core in one direction, so that air currents are induced in the passageways.

3. In a dynamo-electric machine, a laminated core having circumferential ventilating passageways, a frame supporting the core, said frame having an imperforate or unbroken inner wall so that air can not escape radially outward, a rotary field member comprising a rim, field poles secured to said rim, fan-blades on one side of said rim only, and a shield for directing the air from said fan-blades outward along one side of the core and across the outer periphery of the latter in one direction to the other side of the core.

4. In a dynamo-electric machine, a laminated armature core having circumferential ventilating passageways, a frame supporting the core in such a manner that air can pass between the core and frame, a rotary member comprising a spider having a rim, field poles secured to said rim, fan-blades on one side of said rim only, and a shield extending inward from one side of the frame over the end of the core adjacent the fan-blades, so as to direct the air from said fan blades outward along one side of the core and over the outer periphery of the latter, so as to induce air currents in the passageways of the core.

5. In a dynamo-electric machine, a stationary armature comprising a laminated core having circumferential ventilating passageways, an imperforate frame, imperforate end-shields attached to said frame, the frame being so constructed that air can pass freely over the outer periphery of the core, a rotary field member comprising a spider having a rim, field poles secured to the rim, and fan-blades on one side of the rim for causing the air to flow outward along one side of the core, over the outer periphery of the core, to the other side of the core, so that air is thereby drawn through the passageways of the core.

6. In a dynamo-electric machine, a stationary armature comprising a laminated core having circumferential ventilating passageways, a frame having transverse ribs supporting the core, end-shields or end-bells attached to said frame, the wall of the frame and end-shields being imperforate, a rotary field member of the flywheel type comprising a rim, field poles secured to the outer periphery of the rim, and fan-blades on one side of the rim only, for forcing the air outward along one side of the core and over the outer periphery of the core in one direction, whereby air currents are induced in the passageways of the core.

7. In a dynamo-electric machine, a stationary armature provided with radial openings through it, a rotary field member having projecting poles within said armature, and centrifugal fan-blades attached to one side only of said rotating element.

8. In a dynamo-electric machine, a stationary armature provided with radial openings through it, a rotary field member having projecting poles within said armature, centrifugal fan-blades attached to one side only of said rotating element, and means for directing the air currents from said fan-blades across the outer edges of the openings in the armature.

In testimony whereof I affix my signature, in the presence of two witnesses.

BERNARD A. BEHREND.

Witnesses:
ARTHUR F. KWIS,
FRED J. KINSEY.